(12) United States Patent
Lee (10) Patent No.: US 7,142,594 B2
(45) Date of Patent: Nov. 28, 2006

(54) EQUALIZERS

(75) Inventor: Chulhee Lee, Goyang (KR)

(73) Assignee: Industry-Academic Cooperation Foundation Yonsei University, Seoul (KR)

( * ) Notice: Subject to any disclaimer, the term of this patent is extended or adjusted under 35 U.S.C. 154(b) by 738 days.

(21) Appl. No.: 10/382,376

(22) Filed: Mar. 7, 2003

(65) Prior Publication Data

US 2004/0174931 A1 Sep. 9, 2004

(51) Int. Cl.
*H03H 7/30* (2006.01)
(52) U.S. Cl. .................................... 375/229
(58) Field of Classification Search ............... 375/229, 375/230, 231, 232, 233, 234
See application file for complete search history.

(56) References Cited

U.S. PATENT DOCUMENTS

| 5,293,401 A | * | 3/1994 | Serfaty | 375/231 |
| 7,027,500 B1 | * | 4/2006 | Casas et al. | 375/232 |
| 7,027,503 B1 | * | 4/2006 | Smee et al. | 375/233 |

* cited by examiner

*Primary Examiner*—Kevin Kim (57) ABSTRACT

The linear equalizer is implemented utilizing second-order statistics, assuming two classes that have normal distributions, which improves the convergence speed and performance significantly. The idea and teaching of the present invention is also extended with equalization viewed as a multi-class classification problem. Furthermore, the idea and teaching of the present invention is extended to blind equalization.

4 Claims, 4 Drawing Sheets

EQUALIZERS

BACKGROUND OF THE INVENTION

1. Field of the Invention

This invention relates to equalizers that estimate the original signal in the presence of noise, delay and interference.

2. Description of the Related Art

If signal x(n) is transmitted through a linear dispersive channel, the received signal y(n) can be modeled by $$y(n) = \sum_{k=-L}^{L} a_k x(n-k) + e(n) \qquad (1)$$

where e(n) is the additive white Gaussian noise which might be modeled by the following statistics:

$E[e(n)]=0$, $E[e(n)e(m)]=\sigma_e^2 \delta(n-m)$.

It is further assumed that signal x(n) is a binary signal (1, −1) and an equi-probable and independent sequence with the following statistics:

$E[x(n)]=0$, $E[x(n)x(m)]=\sigma_x^2 \delta(n-m)$.

As can be seen in equation (1), 2L+1 signals {y(n−L), y(n−L+1), ..., y(n), ..., y(n+L−1), y(n+L)} contain some information on x(n) and can be used to estimate x(n). These 2L+1 signals can be represented as a vector as follows:

$Y(n)=[y(n-L),y(n-L+1),\ldots,y(n),\ldots,y(n+L-1),y(n+L)]^T$.

Furthermore, {x(n−2L), x(n−2L+1), ..., x(n−1), x(n)} will have some effects on y(n−L) and {x(n), x(n+1), ..., x(n+2L−1), x(n+2L)} on y(n+L). Thus, it can be said that {x(n−2L), x(n−2L+1), ..., x(n), ..., x(n+2L−1), x(n+2L)} affect the estimation of x(n) at the receiver. As stated previously, input vector X(n) and noise vector N(n) are defined as follows:

$X(n)=[x(n-2L),x(n-2L+1),\ldots,x(n),\ldots,x(n+2L-1),x(n+2L)]^T$ $N(n)=[e(n-L),e(n-L+1),\ldots,e(n),\ldots,e(n+L-1),e(n+L)]^T$.

It is noted that the dimension of the input vector, X(n), is 4L+1. This analysis can be easily extended to non-symmetric channels.

Equalization has been important in communications and data storage, and numerous algorithms have been proposed. Among various equalization methods, linear equalization has been widely used due to its speed and simplicity. The linear equalizer is frequently implemented using the LMS algorithm as follows:

$z[n]=W^T(n)Y(n)$ where $Y(n)=[y(n-L),y(n-L+1),\ldots,y(n),\ldots,y(n+L-1),y(n+L)]^T$, z[n] is an output of the equalizer, and $W(n)=[w_{-L}, w_{-L+1},\ldots,w,\ldots,w_{L-1},w_L]^T$ is a weight vector. The weight vector is updated as follows:

$W(n+1)=W(n)+c\lambda Y(n)$ where λ is the learning rate, c is 1 if signal 1 is transmitted and −1 if signal −1 is transmitted.

In the present invention, the linear equalizer is implemented utilizing second-order statistics considering equalization as a classification problem. As a result, the convergence speed and the performance are significantly improved.

SUMMARY OF THE INVENTION

Equalization is an important topic in communications and data storage. In the present invention, equalization is viewed as a two-class classification problem and the linear equalizer is implemented utilizing second order statistics. As a result, the convergence speed and the performance are significantly improved.

Furthermore, the idea and teaching of the present invention is extended when equalization is viewed as a multi-class classification problem.

Still furthermore, the idea and teaching of the present invention is extended to blind equalization.

Thus, it is an object of the present invention to provide linear equalization methods that provide a fast processing time and improved performance.

The other objects, features and advantages of the present invention will be apparent from the following detailed description.

DESCRIPTION OF THE ILLUSTRATED EMBODIMENTS

Embodiment 1

If signal x(n) is transmitted through a linear dispersive channel, the received signal y(n) can be modeled by $$y(n) = \sum_{k=-L}^{L} a_k x(n-k) + e(n). \qquad (2)$$

Although there can be a delay due to the distance between the transmitter and the receiver, such a delay may be assumed to be zero without loss of generality since the delay just represents a time shift at the receiver. For an easy illustration, it is assumed that L=2. It is further assumed that the channel is symmetric ($a_k=a_{-k}$) in equation (2). However, it is noted that the idea and teaching of the present invention can be applied to any value of L and to any non-symmetric channel modeled by $$y(n) = \sum_{k=-L_1}^{L_2} a_k x(n-k) + e(n). \quad (3)$$

If L=2, {y(n−2), y(n−1), y(n), y(n+1), y(n+2)} will be affected by x(n). In other words, {y(n−2), y(n−1), y(n), y(n+1), y(n+2)} contain information on x(n) and can be used to estimate x(n). Furthermore, as can be seen in equation (2), y(n+2) and y(n−2) are obtained as follows:

$$y(n+2) = \sum_{k=-L}^{L} a_k x(n+2-k) + e(n+2)$$
$$= a_2 x(n) + a_1 x(n+1) + a_0 x(n+2) +$$
$$a_1 x(n+3) + a_2 x(n+4) + e(n+2)$$

$$y(n-2) = \sum_{k=-L}^{L} a_k x(n-2-k) + e(n-2).$$
$$= a_2 x(n-4) + a_1 x(n-3) + a_0 x(n-2) +$$
$$a_1 x(n-1) + a_2 x(n) + e(n-2).$$

Therefore, in order to estimate x(n), {y(n−2), y(n−1), y(n), y(n+1), y(n+2)} should be used and {x(n−4), x(n−3), x(n−2), x(n−1), x(n), x(n+1), x(n+2), x(n+3), x(n+4)} have effects on {y(n−2), y(n−1), y(n), y(n+1), y(n+2)}. As a result, it can be observed that {x(n−4), x(n−3), x(n−2), x(n−1), x(n), x(n+1), x(n+2), x(n+3), x(n+4)} affect the estimation of x(n) at the receiver.

Furthermore, {y(n−2), y(n−1), y(n), y(n+1), y(n+2)} can be computed in matrix form as follows:

$$\begin{bmatrix} y(n-2) \\ y(n-1) \\ y(n) \\ y(n+1) \\ y(n+2) \end{bmatrix} = \begin{bmatrix} a_2 & a_1 & a_0 & a_1 & a_2 & 0 & 0 & 0 & 0 \\ 0 & a_2 & a_1 & a_0 & a_1 & a_2 & 0 & 0 & 0 \\ 0 & 0 & a_2 & a_1 & a_0 & a_1 & a_2 & 0 & 0 \\ 0 & 0 & 0 & a_2 & a_1 & a_0 & a_1 & a_2 & 0 \\ 0 & 0 & 0 & 0 & a_2 & a_1 & a_0 & a_1 & a_2 \end{bmatrix} \begin{bmatrix} x(n-4) \\ x(n-3) \\ x(n-2) \\ x(n-1) \\ x(n) \\ x(n+1) \\ x(n+2) \\ x(n+3) \\ x(n+4) \end{bmatrix} + \begin{bmatrix} e(n-2) \\ e(n-1) \\ e(n) \\ e(n+1) \\ e(n+2) \end{bmatrix}. \quad (4)$$

When L=2, input vector X(n), received vector Y(n), and noise vector N(n) a time n are defined as follows:

$$Y(n)=[y(n-2),y(n-1),y(n),y(n+1),y(n+2)]^T,$$

$$X(n)=[x(n-4),x(n-3),x(n-2),x(n-1),x(n),x(n+1),x(n+2),x(n+3),x(n+4)]^T,$$

$$N(n)=[e(n-2),e(n-1),e(n),e(n+1),e(n+2)]^T.$$

In addition, matrix A is defined as follows:

$$A = \begin{bmatrix} a_2 & a_1 & a_0 & a_1 & a_2 & 0 & 0 & 0 & 0 \\ 0 & a_2 & a_1 & a_0 & a_1 & a_2 & 0 & 0 & 0 \\ 0 & 0 & a_2 & a_1 & a_0 & a_1 & a_2 & 0 & 0 \\ 0 & 0 & 0 & a_2 & a_1 & a_0 & a_1 & a_2 & 0 \\ 0 & 0 & 0 & 0 & a_2 & a_1 & a_0 & a_1 & a_2 \end{bmatrix}.$$

Then, equation (4) can be rewritten as $$Y(n)=AX(n)+N(n).$$

In general, the size of matrix A will be (2L+1)×(4L+1), input vector X(n) (4L+1)×1 and received vector Y(n) (2L+1)×1. Furthermore, the input vector X(n), the received vector Y(n) and the noise vector N(n) can be viewed as random vectors, assuming a stationary process.

According to the idea and teaching of the present invention, equalization is viewed as a classification problem where the equalizer classifies the received vector Y(n) as one of the binary states (1, −1). If state 1 is transmitted at time ii, the input vector is given by $$X_1:X(n)=[x(n-4),x(n-3),x(n-2),x(n-1), 1,x(n+1),x(n+2),x(n+3),x(n+4)]^T$$

where $X_1$ represents a random vector and the subscript of random vector $X_1$ indicates that state 1 is transmitted (class $\omega_1$). It is noted that $X_1$ is to be understood as a random vector and X(n) represents a sample vector of the input vector at time n. Furthermore, it is noted that the idea and teaching of the present invention can be easily applied even when there are more than 2 states. The mean vector and covariance matrix of $X_1$ are given by $$\mu_{X_1}=E\{X_1\}=[0,0,0,0,1,0,0,0,0]^T$$

$$\sum_{X_1} = E\{(X_1 - \mu_{X_1})(X_1 - \mu_{X_1})^T\}$$
$$= Diag(1, 1, 1, 1, 0, 1, 1, 1, 1)$$
$$= \begin{bmatrix} 1 & 0 & 0 & 0 & 0 & 0 & 0 & 0 & 0 \\ 0 & 1 & 0 & 0 & 0 & 0 & 0 & 0 & 0 \\ 0 & 0 & 1 & 0 & 0 & 0 & 0 & 0 & 0 \\ 0 & 0 & 0 & 1 & 0 & 0 & 0 & 0 & 0 \\ 0 & 0 & 0 & 0 & 1 & 0 & 0 & 0 & 0 \\ 0 & 0 & 0 & 0 & 0 & 1 & 0 & 0 & 0 \\ 0 & 0 & 0 & 0 & 0 & 0 & 1 & 0 & 0 \\ 0 & 0 & 0 & 0 & 0 & 0 & 0 & 1 & 0 \\ 0 & 0 & 0 & 0 & 0 & 0 & 0 & 0 & 1 \end{bmatrix}$$
$$= I - \mu_{X_1}(\mu_{X_1})^T$$

where I is an identity matrix since it is assumed that signal x(n) is a binary signal (1,−1) and that x(n) is an equiprobable and independent sequence. Although it is assumed that x(n) is a binary signal, the teaching and idea of the present invention are still valid for other types of signals.

If state −1 is transmitted, the input vector is represented by $$X_{-1}:X(n)=[x(n-4),x(n-3),x(n-2),x(n-1), -1,x(n+1),x(n+2),x(n+3),x(n+4)]^T$$

where $X_{-1}$ represents a random vector and the subscript of random vector $X_{-1}$ indicates that state $-1$ is transmitted (class $\omega_2$). The mean vector and covariance matrix of $X_{-1}$ are given by $$\mu_{X_{-1}} = E\{X_{-1}\} = [0,0,0,0,-1,0,0,0,0]^T = \mu_{X_1}$$

$$\Sigma_{X_{-1}} = E\{(X_{-1}-\mu_{X_{-1}})(X_{-1}-\mu_{X_{-1}})^T\} = \text{Diag}(1,1,1,1,0,1,1,1,1) = \Sigma_{X_1}.$$

On the other hand, if state 1 is transmitted, the received vector can be computed as $$Y_1 : Y(n) = \begin{bmatrix} y(n-2) \\ y(n-1) \\ y(n) \\ y(n+1) \\ y(n+2) \end{bmatrix}$$

-continued $$= \begin{bmatrix} a_2 & a_1 & a_0 & a_1 & a_2 & 0 & 0 & 0 & 0 \\ 0 & a_2 & a_1 & a_0 & a_1 & a_2 & 0 & 0 & 0 \\ 0 & 0 & a_2 & a_1 & a_0 & a_1 & a_2 & 0 & 0 \\ 0 & 0 & 0 & a_2 & a_1 & a_0 & a_1 & a_2 & 0 \\ 0 & 0 & 0 & 0 & a_2 & a_1 & a_0 & a_1 & a_2 \end{bmatrix} \begin{bmatrix} x(n-4) \\ x(n-3) \\ x(n-2) \\ x(n-1) \\ 1 \\ x(n+1) \\ x(n+2) \\ x(n+3) \\ x(n+4) \end{bmatrix} + \begin{bmatrix} e(n-2) \\ e(n-1) \\ e(n) \\ e(n+1) \\ e(n+2) \end{bmatrix}$$

where the subscript of $Y_1$ indicates that state 1 is transmitted (class $\omega_1$). In this paradigm, the received vector, $Y_1$, can also be viewed as a random vector. It is noted that $Y_1(n)$ represents a sample vector of random vector $Y_1$ with $x(n)=1$. The mean vector and covariance matrix of $Y_1$ are given by $$\mu_{Y_1} = A\mu_{X_1} = [a_2, a_1, a_0, a_1, a_2]^T$$

$$\begin{aligned}
\sum_{Y_1} &= E\{(Y_1 - \mu_{Y_1})(Y_1 - \mu_{Y_1})^T\} \\
&= E\{(AX_1 - A\mu_{X_1} + N)(AX_1 - A\mu_{X_1} + N)^T\} \\
&= E\{(AX_1 - A\mu_{X_1})(AX_1 - A\mu_{X_1})^T + (AX_1 - A\mu_{X_1})N^T + N(AX_1 - A\mu_{X_1})^T + NN^T\} \\
&= E\{(AX_1 - A\mu_{X_1})(AX_1 - A\mu_{X_1})^T\} + E\{(AX_1 - A\mu_{X_1})N^T\} + E\{N(AX_1 - A\mu_{X_1})^T\} + E\{NN^T\} \\
&= E\{A(X_1 - \mu_{X_1})(X_1 - \mu_{X_1})^T A^T\} + E\{NN^T\} + E\{(AX_1 - A\mu_{X_1})N^T\} + E\{N(AX_1 - A\mu_{X_1})^T\} \\
&= A\sum_{X_1} A^T + \sigma_e^2 I + AE\{X_1 N^T\} - A\mu_{X_1} E\{N^T\} + E\{NX_1^T\}A^T - E\{N\}\mu_{X_1}^T A^T
\end{aligned}$$

where N is the noise vector. Since $AE\{X_1 N^T\} = A\mu_{X_1} E\{N^T\} = E\{NX_1^T\}A^T = E\{N\}\mu_{X_1}^T A^T = 0$, the covariance matrix of $Y_1$ is given by $$\sum_{Y_1} = A\sum_{X_1} A^T + \sigma_e^2 I$$

$$= \begin{bmatrix} a_2 a_2 + 2a_1 a_1 + a_0 a_0 + \sigma_e^2 & a_1 a_2 + 2a_0 a_1 & a_0 a_2 + a_1 a_1 & a_1 a_2 & 0 \\ a_1 a_2 + 2a_0 a_1 & 2a_2 a_2 + a_1 a_1 + a_0 a_0 + \sigma_e^2 & 2a_1 a_2 + a_0 a_1 & 2a_0 a_2 & a_1 a_2 \\ a_0 a_2 + a_1 a_1 & 2a_1 a_2 + a_0 a_1 & 2a_2 a_2 + 2a_1 a_1 + \sigma_e^2 & 2a_1 a_2 + a_0 a_1 & a_0 a_2 + a_1 a_1 \\ a_1 a_2 & 2a_0 a_2 & 2a_1 a_2 + a_0 a_1 & 2a_2 a_2 + a_1 a_1 + a_0 a_0 + \sigma_e^2 & a_1 a_2 + 2a_0 a_1 \\ 0 & a_1 a_2 & a_0 a_2 + a_1 a_1 & a_1 a_2 + 2a_0 a_1 & a_2 a_2 + 2a_1 a_1 + a_0 a_0 + \sigma_e^2 \end{bmatrix}.$$

Similarly, if state $-1$ is transmitted, the received vector can be computed as $$Y_{-1}(n) = \begin{bmatrix} y(n-2) \\ y(n-1) \\ y(n) \\ y(n+1) \\ y(n+2) \end{bmatrix}$$

$$= \begin{bmatrix} a_2 & a_1 & a_0 & a_1 & a_2 & 0 & 0 & 0 & 0 \\ 0 & a_2 & a_1 & a_0 & a_1 & a_2 & 0 & 0 & 0 \\ 0 & 0 & a_2 & a_1 & a_0 & a_1 & a_2 & 0 & 0 \\ 0 & 0 & 0 & a_2 & a_1 & a_0 & a_1 & a_2 & 0 \\ 0 & 0 & 0 & 0 & a_2 & a_1 & a_0 & a_1 & a_2 \end{bmatrix}$$

-continued $$\begin{bmatrix} x(n-4) \\ x(n-3) \\ x(n-2) \\ x(n-1) \\ -1 \\ x(n+1) \\ x(n+2) \\ x(n+3) \\ x(n+4) \end{bmatrix} + \begin{bmatrix} e(n-2) \\ e(n-1) \\ e(n) \\ e(n+1) \\ e(n+2) \end{bmatrix}$$

where the subscript of $Y_{-1}$ indicates that state $-1$ is transmitted (class $\omega_2$). As explained previously, the received vector, $Y_{-1}$, can also be viewed as a random vector. When state $-1$ is transmitted, the mean vector and covariance matrix of $Y_{-1}$ are given by $$\mu_{Y_{-1}} = A\mu_{X_{-1}} = -[a_2, a_1, a_0, a_1, a_2]^T = -\mu_{Y_1}$$

$$\begin{aligned} \Sigma_{Y_{-1}} &= E\{(Y_{-1} - \mu_{Y_{-1}})(Y_{-1} - \mu_{Y_{-1}})^T\} \\ &= E\{(AX_{-1} - A\mu_{X_{-1}} + N)(AX_{-1} - A\mu_{X_{-1}} + N)^T\} \\ &= A\Sigma_{X_{-1}}A^T + \sigma_e^2 I \\ &= \Sigma_{Y_1} \end{aligned}$$

Figure 1:
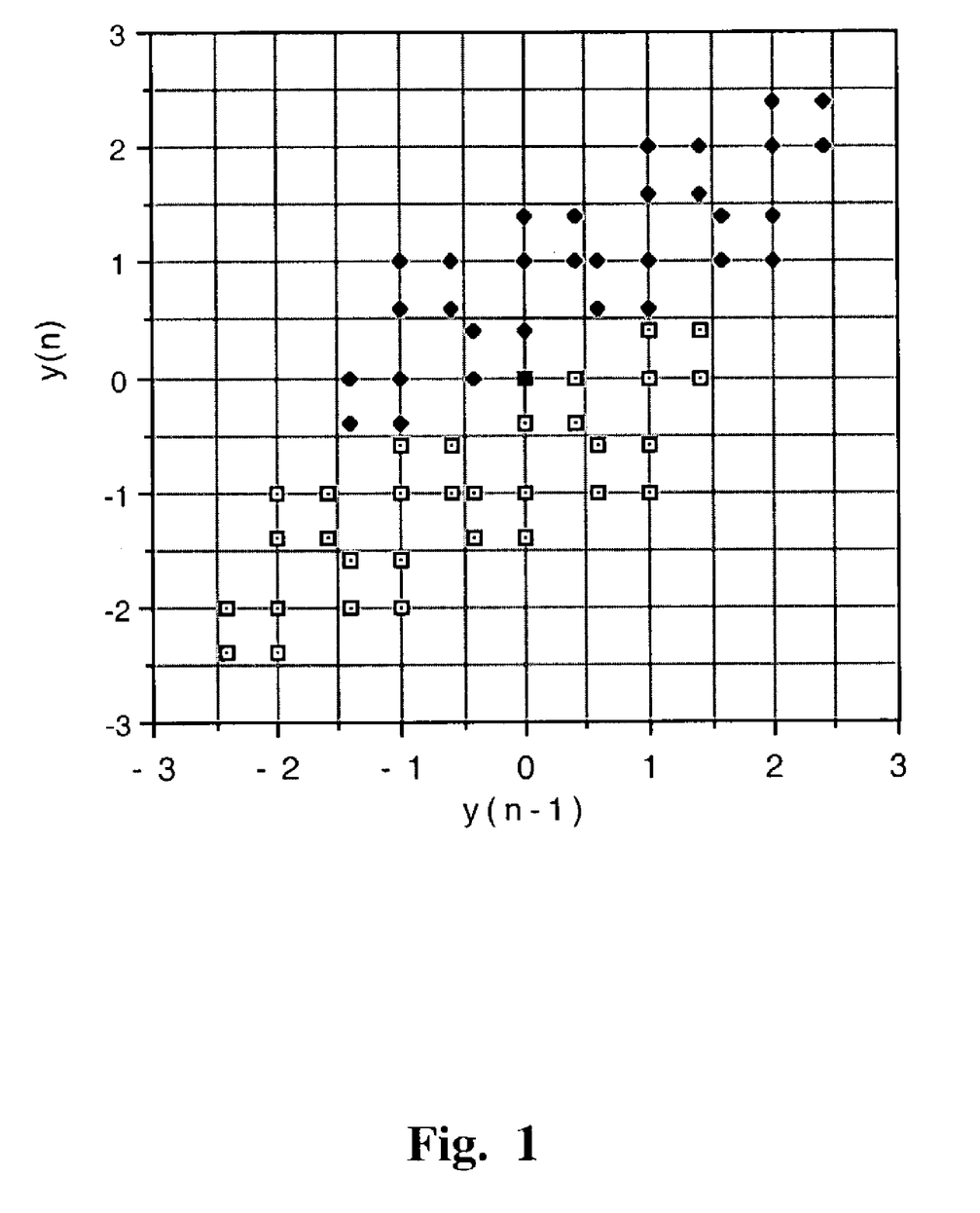
FIG. 1 shows the distribution of $Y_1$ and $Y_{-1}$ in the $y_n$–$y_{n-1}$ space.
Figure 2:
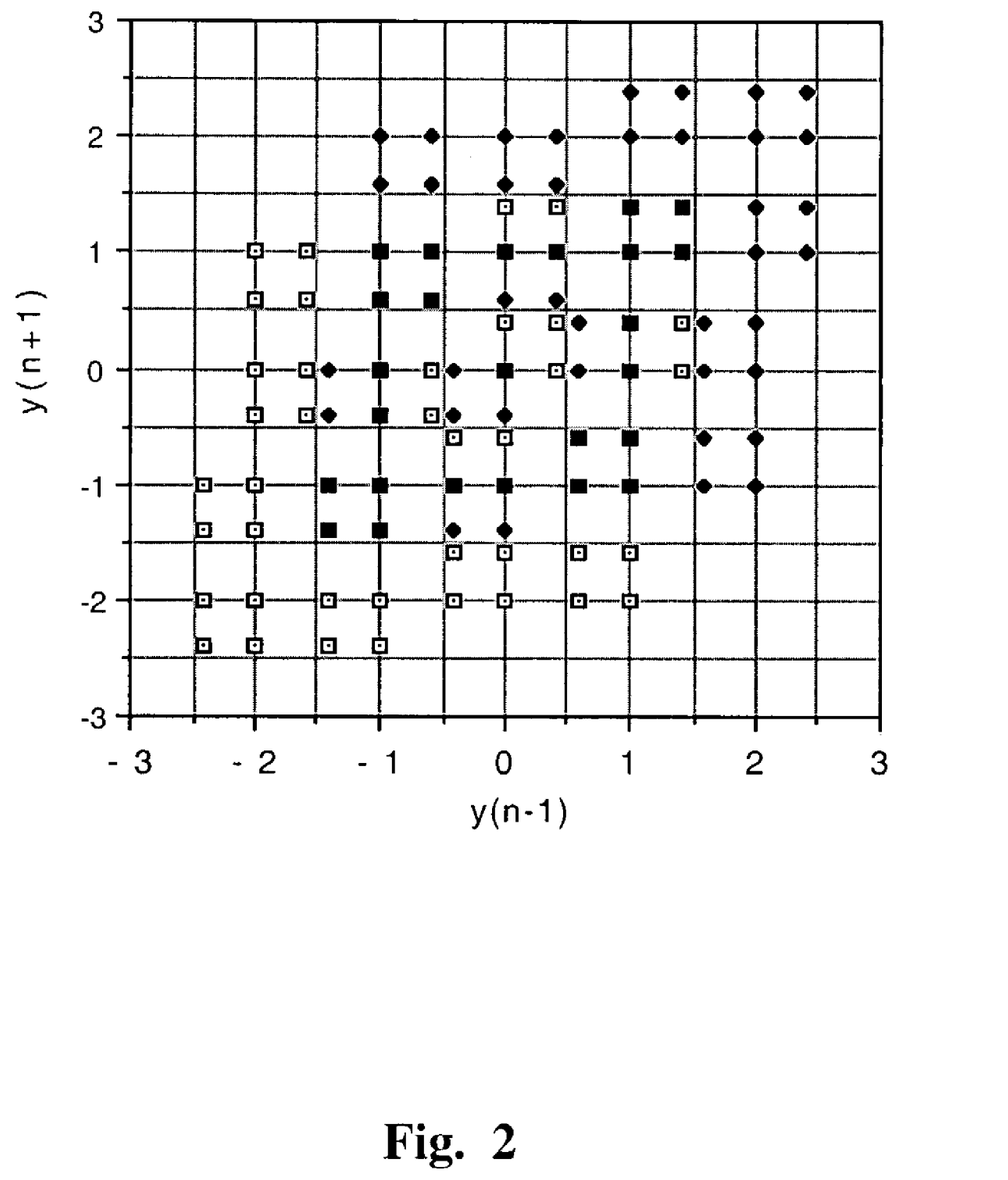
FIG. 2 shows the distribution of $Y_1$ and $Y_{-1}$ in the $y_{n+1}$–$y_{n-1}$ space.

It can be seen that $\mu_{Y_{-1}} = -\mu_{Y_1}$ and $\Sigma_{Y_1} = \Sigma_{Y_{-1}}$. Assuming $L=2$, the received vectors, $Y_1$ and $Y_{-1}$, are distributed in a 5-dimensional space. FIG. 1 shows the distribution of $Y_1$ and $Y_{-1}$ in the $y_n$–$y_{n-1}$ space assuming that $a_0=1$, $a_1=0.5$, $a_2=0.2$, and $e(n)=0$ and FIG. 2 shows the distribution of $Y_1$ and $Y_{-1}$ in the $Y_{n+1}$–$Y_{-1}$ space. If the Gaussian distribution is assumed for $Y_1$ and $Y_{-1}$, the decision boundary between $Y_1$ and $Y_{-1}$ is a hyper-plane since the covariance matrices are identical. Consequently, the optimal linear classifier is given by $$w = \Sigma_Y^{-1}(\mu_{Y_1} - \mu_{Y_{-1}}) = 2\Sigma_Y^{-1}\mu_{Y_1} = 2\Sigma_Y^{-1}[a_2, a_1, a_0, a_1, a_2]^T \quad (5)$$

where $\Sigma_Y = A\Sigma_{X_1}A^T + \sigma_e^2 1$. In other words, if $\{a_k\}$ and $\sigma_e^2$ are given, the optimal linear equalizer is obtained using equation (5). In this case, the decision rule is as follows:

if $w^T Y(n) > 0$, then decide that state 1 is transmitted, if $w^T Y(n) < 0$, then decide that state $-1$ is transmitted.

If $w^T Y(n) = 0$, one can decide the received signal as either state 1 or state $-1$. Alternatively, one can reject it. In practice, such a case would be rare. It is noted that equation (5) can be used even if the Gaussian distribution is not assumed for the $Y_1$ and $Y_{-1}$.

Embodiment 2

In many real world problems, the coefficients $\{a_k\}$ and the noise power $\sigma_e^2$ of equations (2) and (3) are unknown, and they should be estimated from training samples. Typically, at the beginning of communication or at a regular interval, the transmitter transmits a training sequence, which is also known at the receiver. By analyzing the received signals, the receiver estimates the channel characteristics. For instance, the linear equalizer is implemented using the following LMS algorithm:

$$z[n] = W^T(n)Y(n)$$

where $Y(n) = [y(n-L), y(n-L+1), \ldots, y(n), \ldots, y(n+L-1), y(n+L)]^T$, $z[n]$ is an output of equalizer, and $W(n) = [w_{-L}, w_{-L+1}, \ldots, w, \ldots, w_{L-1}, w_L]^T$ is a weight vector. The weight vector is updated as follows:

$$W(n+1) = W(n) + c\lambda Y(n)$$

where $\lambda$ is the learning rate, c is 1 if signal 1 is transmitted and $-1$ if signal $-1$ is transmitted. As can be seen, the weight vector is updated using the training sequences that are transmitted at the beginning of communication or at a regular interval.

Figure 3:
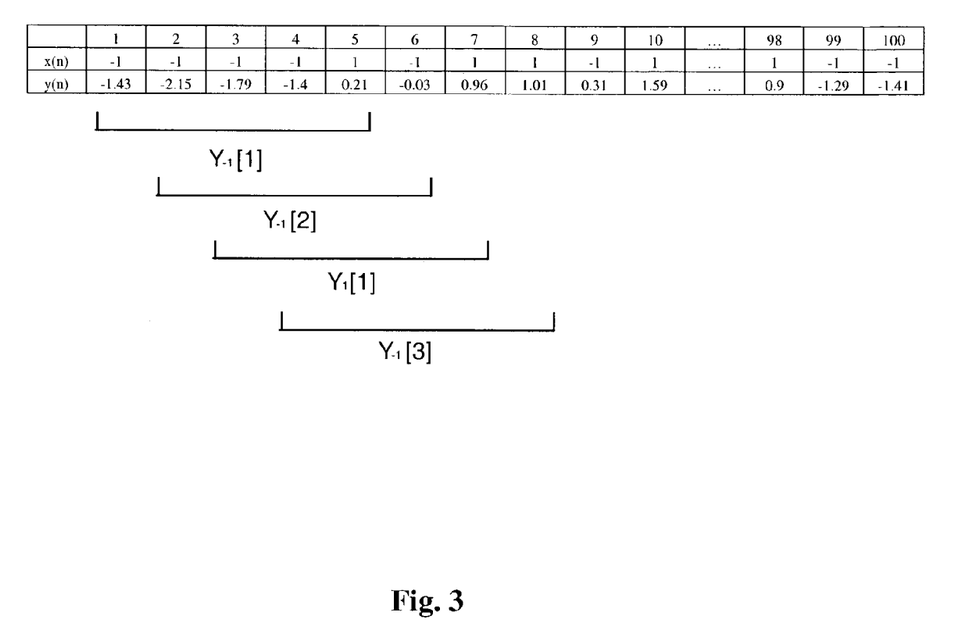
FIG. 3 illustrates how $Y_1(i)$ and $Y_{-1}(i)$ are constructed.

The idea and teaching of the present invention can be applied to this situation. From the training sequence, the mean vector and the covariance matrix of $Y_1$ can be estimated as follows:

$$\hat{\mu}_{Y_1} = \frac{1}{N_1} \sum_{i=1}^{N_1} Y_1(i)$$

$$\hat{\Sigma}_{Y_1} = \frac{1}{N_1} \sum_{i=1}^{N_1} (Y_1(i) - \hat{\mu}_{Y_1})(Y_1(i) - \hat{\mu}_{Y_1})^T$$

where $Y_1(i)$ is the i-th received vector of class $\omega_1$ (state 1 is transmitted), the subscript of $Y_1(i)$ indicates that state 1 is transmitted and $N_1$ is the number of vectors corresponding to class $\omega_1$ that can be obtained from the training sequence. It is noted that $Y_1$ is a random vector and $Y_1(i)$ is the i-th sample vector. Similarly, the mean vector and the covariance matrix of $Y_{-1}$ can be estimated as follows:

$$\hat{\mu}_{Y_{-1}} = \frac{1}{N_{-1}} \sum_{i=1}^{N_{-1}} Y_{-1}(i)$$

$$\hat{\Sigma}_{Y_{-1}} = \frac{1}{N_{-1}} \sum_{i=1}^{N_{-1}} (Y_{-1}(i) - \hat{\mu}_{Y_{-1}})(Y_{-1}(i) - \hat{\mu}_{Y_{-1}})^T$$

where $N_{-1}$ is the number of vectors corresponding to class $\omega_2$ that can be obtained from the training sequence. In general, when $L=2$, the first two training samples may not generate the corresponding received vectors since $y(-1)$ and $y(-2)$ are required to do so. Although one might use arbitrary values for $y(-1)$ and $y(-2)$, it might be better not to use them. Similarly, when $L=2$, the last two training samples does not generate the corresponding received vectors since $y(101)$ and $y(102)$ are required to do so, assuming that there are 100 training samples. FIG. 3 illustrates how $Y_1(i)$ and $Y_{-1}(i)$ are constructed. As explained previously, the first two samples do not generate output vectors. Since $x(3)=-1$, the corresponding vector will belong to $Y_{-1}$. In other words, $Y_{-1}(1) = [-1.43, -2.15, -1.79, -1.4, 0.21]^T$. Since $x(4) = -1$, the corresponding vector will also belong to $Y_{-1}$ With $Y_{-1}(2) = [-2.15, -1.79, -1.4, 0.21, -0.03]^T$. Similarly, the following received vectors are $Y_1(1) = [-1.79, -1.4, 0.21, -0.03, 0.96]^T$, $Y_{-1}(3) = [-1.4, 0.21, -0.03, 0.96, 1.01]^T$, and $Y_1(2) = [0.21, -0.03, 0.96, 1.01, 0.31]^T$. It is noted that the indices of $Y_1$ and $Y_{-1}$ are different from those of Y.

If a linear dispersive channel is assumed, $\hat{\Sigma}_{Y_1}$ and $\hat{\Sigma}_{Y_{-1}}$ should be identical and $\hat{\mu}_{Y_1} = -\hat{\mu}_{Y_{-1}}$. However, in real world problems, these estimations might be different. Thus, one might take the average of $\hat{\Sigma}_{Y_1}$ and $\hat{\Sigma}_{Y_{-1}}$ as follows:

$$\hat{\Sigma}_Y = (\hat{\Sigma}_{Y_1} + \hat{\Sigma}_{Y_{-1}})/2.$$

Finally, the linear equalizer is obtained by $$w=\hat{\Sigma}_Y^{-1}(\hat{\mu}_{Y_1}-\hat{\mu}_{Y_{-1}}). \quad (6)$$

It is noted that equation (6) can be used for any type of channel. In other words, the channel does not have to be linear. It can be a non-symmetric channel or a non-linear channel. If there are more than 2 states, the idea and teaching of the present invention can be easily extended. As explained previously, the decision rule is as follows:

if $w^T Y(n)>0$, then decide that state 1 is transmitted, if $w^T Y(n)<0$, then decide that state $-1$ is transmitted.

If $w^T Y(n)=0$, one can decide the received signal as either state 1 or state $-1$. In practice, such a case would be rare.

Embodiment 3

According to the teaching and idea of the present invention, equalization is viewed as a classification problem where the equalizer classifies the received vector $Y(n)$ as one of the binary states $(1, -1)$. This idea can be extended to multi-states. In other words, instead of viewing equalization as a classification problem where the equalizer classifies the received vector $Y(n)$ as one of the binary states, equalization can be viewed as a multi-class classification problem. For instance, equalization might be viewed as an 8 class classification problem when 3 bits are considered. In other words, if state $(1,1,1)$ is transmitted (class $\omega_1$), the input vector is given by $$X_1: X(n)=[x(n-5),x(n-4),x(n-3),x(n-2),1,1,1,x(n+2),x(n+3),x(n+4),x(n+5)]^T,$$

assuming L=2. It is noted that $(1,1,1)$ represents the values of $x(n-1),x(n),x(n+1)$, respectively. Similarly, when the remaining 7 states are transmitted, the corresponding input vectors are given by $$X_2: X(n)=[x(n-5),x(n-4),x(n-3),x(n-2),1,1,-1,x(n+2),x(n+3),x(n+4),x(n+5)]^T$$

$$X_3: X(n)=[x(n-5),x(n-4),x(n-3),x(n-2),1,-1,1,x(n+2),x(n+3),x(n+4),x(n+5)]^T$$

$$X_4: X(n)=[x(n-5),x(n-4),x(n-3),x(n-2),1,-1,-1,x(n+2),x(n+3),x(n+4),x(n+5)]^T$$

$$X_5: X(n)=[x(n-5),x(n-4),x(n-3),x(n-2),-1,1,1,x(n+2),x(n+3),x(n+4),x(n+5)]^T$$

$$X_6: X(n)=[x(n-5),x(n-4),x(n-3),x(n-2),-1,1,-1,x(n+2),x(n+3),x(n+4),x(n+5)]^T$$

$$X_7: X(n)=[x(n-5),x(n-4),x(n-3),x(n-2),-1,-1,1,x(n+2),x(n+3),x(n+4),x(n+5)]^T$$

$$X_8: X(n)=[x(n-5),x(n-4),x(n-3),x(n-2),-1,-1,-1,x(n+2),x(n+3),x(n+4),x(n+5)]^T$$

It is noted that random vectors $X_1$, $X_2$, $X_3$, $X_4$, $X_5$, $X_6$, $X_7$ and $X_8$ correspond to class $\omega_1$, class $\omega_2$, class $\omega_3$, class $\omega_4$, class $\omega_5$, class $\omega_6$, class $\omega_7$ and class $\omega_8$, respectively.

Assuming L=2 in equation (1), $\{y(n-3), y(n-2), y(n-1), y(n), y(n+1), y(n+2), y(n+3)\}$ will be affected by $x(n-1)$, $x(n)$ and $x(n+1)$. In other words, $\{y(n-3), y(n-2), y(n-1), y(n), y(n+1), y(n+2), y(n+3)\}$ contain some information on $x(n-1)$, $x(n)$ and $x(n+1)$ and can be used for equalization. Furthermore, if state $(1,1,1)$ is transmitted, the received vector can be computed as $$Y_1: Y(n) = \begin{bmatrix} y(n-3) \\ y(n-2) \\ y(n-1) \\ y(n) \\ y(n+1) \\ y(n+2) \\ y(n+3) \end{bmatrix}$$

$$= \begin{bmatrix} a_2 & a_1 & a_0 & a_1 & a_2 & 0 & 0 & 0 & 0 & 0 & 0 \\ 0 & a_2 & a_1 & a_0 & a_1 & a_2 & 0 & 0 & 0 & 0 & 0 \\ 0 & 0 & a_2 & a_1 & a_0 & a_1 & a_2 & 0 & 0 & 0 & 0 \\ 0 & 0 & 0 & a_2 & a_1 & a_0 & a_1 & a_2 & 0 & 0 & 0 \\ 0 & 0 & 0 & 0 & a_2 & a_1 & a_0 & a_1 & a_2 & 0 & 0 \\ 0 & 0 & 0 & 0 & 0 & a_2 & a_1 & a_0 & a_1 & a_2 & 0 \\ 0 & 0 & 0 & 0 & 0 & 0 & a_2 & a_1 & a_0 & a_1 & a_2 \end{bmatrix}$$

$$\begin{bmatrix} x(n-5) \\ x(n-4) \\ x(n-3) \\ x(n-2) \\ 1 \\ 1 \\ 1 \\ x(n+2) \\ x(n+3) \\ x(n+4) \\ x(n+5) \end{bmatrix} + \begin{bmatrix} e(n-3) \\ e(n-2) \\ e(n-1) \\ e(n) \\ e(n+1) \\ e(n+2) \\ e(n+3) \end{bmatrix}$$

On the other hand, the mean vector and covariance matrix of input vector $X_1$ are given by $$\mu_{X_1}=E\{X_1\}=[0,0,0,0,1,1,1,0,0,0,0]^T$$

$$\Sigma_{X_1}=E\{(X_1-\mu_{X_1})(X_1-\mu_{X_1})^T\}=\text{Diag}(1,1,1,1,0,0,0,1,1,1,1).$$

As stated previously, the mean vector and covariance matrix of received vector $Y_1$ are given by $$\mu_{Y_1}=A\mu_{X_1}=[a_2,a_1,+a_2,a_0+a_1,+a_2,2a_0+a_1,a_0+a_1+a_2,a_1+a_2,a_2]^T$$

$$\Sigma_{Y_1}=A\Sigma_{X_1}A^T\sigma_e^2 1$$

where $$A = \begin{bmatrix} a_2 & a_1 & a_0 & a_1 & a_2 & 0 & 0 & 0 & 0 & 0 & 0 \\ 0 & a_2 & a_1 & a_0 & a_1 & a_2 & 0 & 0 & 0 & 0 & 0 \\ 0 & 0 & a_2 & a_1 & a_0 & a_1 & a_2 & 0 & 0 & 0 & 0 \\ 0 & 0 & 0 & a_2 & a_1 & a_0 & a_1 & a_2 & 0 & 0 & 0 \\ 0 & 0 & 0 & 0 & a_2 & a_1 & a_0 & a_1 & a_2 & 0 & 0 \\ 0 & 0 & 0 & 0 & 0 & a_2 & a_1 & a_0 & a_1 & a_2 & 0 \\ 0 & 0 & 0 & 0 & 0 & 0 & a_2 & a_1 & a_0 & a_1 & a_2 \end{bmatrix}.$$

The input vectors, received vectors, mean vectors and covariance matrices of the other states can be obtained similarly. Assuming that the Gaussian distribution for each class, the following decision rule can be used:

Decide $\omega_j$ if $g_j(Y)>g_k(Y)$ for all $k \neq j$ \quad (7)

where $g_j(Y)=-\ln(\Sigma_{Y_j})-(Y-\mu_{Y_j})\Sigma_{Y_j}^{-1}(Y-\mu_{Y_j})^T$.

If the covariance matrices are identical, the following rule can be further simplified as follows:

Decide $\omega_j$ if $g_j(Y) > g_k(Y)$ for all $k \neq j$ (8)

where $g_j(Y) = 2Y\Sigma_{Y_j}^{-1}\mu_{Y_j}^T - \mu_{Y_j}\Sigma_{Y_j}^{-1}\mu_{Y_j}^T = 2\mu_{Y_j}\Sigma_{Y_j}^{-1}Y^T - \mu_{Y_j}\Sigma_{Y_j}^{-1}\mu_{Y_j}^T$.

It is noted that the above decision rules can be used even when one can not assume the Gaussian distribution for each class.

In general, the coefficients $\{a_k\}$ and the noise power $\sigma_e^2$ are unknown in many real world problems. As in the previous cases, all the parameters can be estimated from a training sequence. For instance, the mean vector and the covariance matrix of $Y_1$ can be estimated as follows:

$$\hat{\mu}_{Y_1} = \frac{1}{N_1}\sum_{i=1}^{N_1} Y_1(i)$$

$$\hat{\Sigma}_{Y_1} = \frac{1}{N_1}\sum_{i=1}^{N_1}(Y_1(i) - \hat{\mu}_{Y_1})(Y_1(i) - \hat{\mu}_{Y_1})^T$$

where $Y_1(i)$ is the i-th received vector of class $\omega_1$ (state (1,1,1) is transmitted), the subscript of $Y_1(i)$ indicates that state (1,1,1) is transmitted and $N_1$ is the number of vectors corresponding to class $\omega_1$ that can be obtained from the training sequence. The mean vectors and the covariance matrices of the other received vectors corresponding to the other states can be estimated similarly. In other words, the mean vector and covariance matrix of class $\omega_j$ can be computed as follows:

$$\hat{\mu}_{Y_j} = \frac{1}{N_j}\sum_{i=1}^{N_j} Y_j(i)$$

$$\hat{\Sigma}_{Y_j} = \frac{1}{N_j}\sum_{i=1}^{N_j}(Y_j(i) - \hat{\mu}_{Y_j})(Y_j(i) - \hat{\mu}_{Y_j})^T.$$

Figure 4A:
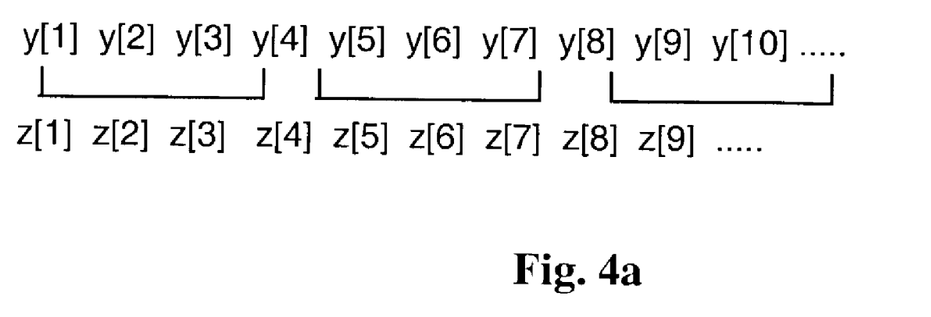
FIG. 4a illustrates how the equalizer classifies three samples at one time by treating three received samples as one state.
Figure 4B:
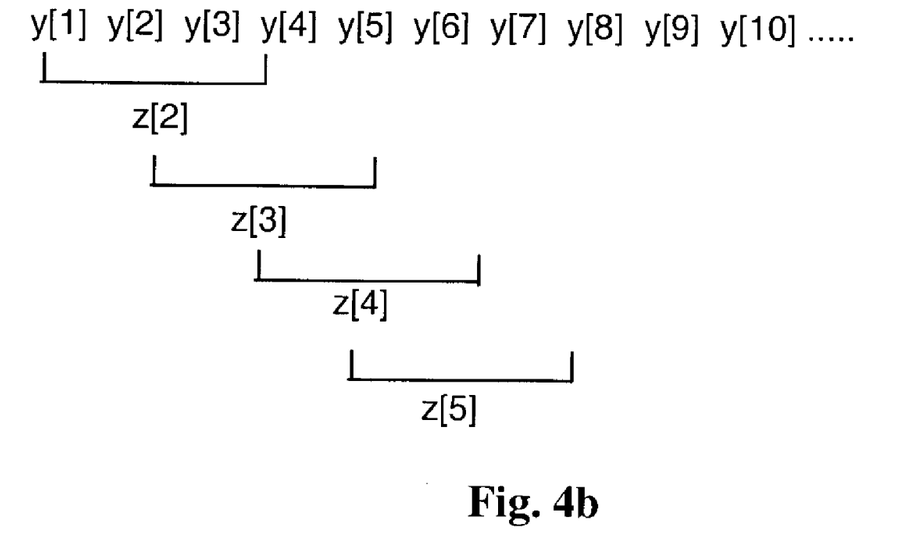
FIG. 4b illustrates how the performance of the equalizer can be enhanced by classifying one sample at a time.

By treating three received samples as one state, the above equalizer can classify three samples at one time (FIG. 4*a*). However, in order to enhance the performance, the above equalizer can classify one sample at a time. In this scheme, states $\{(1,1,1), (1,1,-1), (-1,1,1), (-1,1,-1)\}$ indicate that state 1 is transmitted and states $\{(1,-1,1), (1,-1,-1), (-1,-1,1), (-1,-1,-1)\}$ indicate that state $-1$ is transmitted. This operation is illustrated in FIG. 4*b*.

In the above illustration, equalization is viewed as an 8-class classification problem by considering 3 bits. It is noted that by considering a different number of bits, the number of classes can be changed. For instance, if 5 bits are considered, equalization can be viewed as a 32-class classification problem.

Embodiment 4

The idea and teaching of the present can be applied to blind equalization. In many real world problems, not only the coefficients $\{a_k\}$ and the noise powers $\sigma_e^2$ are unknown, but also a training sequence is not available. In this case, the receiver should estimate those parameters without training samples. By analyzing received signals, the receiver estimates the channel characteristics using unlabeled received samples. The idea and teaching of the present can be applied to this kind of problem. For instance, the equalizer starts with initial parameters $\{N_j^{initial}, \mu_j^{initial}, \Sigma_j^{initial}\}$ where $N_j^{initial}$ is the initially assumed number of training samples of class $\omega_j$, $\mu_j^{initial}$ is the initial estimator of the mean vector of class $\omega_j$, and $\Sigma_j^{initial}$ is the initial estimator of the covariance matrix of class $\omega_j$. Then, the equalizer classifies an incoming sample and uses the result to update the statistics of the corresponding class. In order to recursively update the parameters (mean vectors and covariance matrices), the following statistics are computed:

$$SUMY_j(N_j) = \sum_{i=1}^{N_j} Y_j(i)$$

$$SUMYY_j(N_j) = \sum_{i=1}^{N_j} Y_j(i)Y_j(i)^T$$

where $Y_j(i)$ is a vector. With the initial parameters, $SUMY_j$ and $SUMYY_j$ of class $\omega_j$ are computed as follows:

$$SUMY_j(N_j) = SUMY_j^{initial} + \sum_{i=N_j^{initial}+1}^{N_j} Y_j(i)$$

$$SUMYY_j(N_j) = SUMYY_j^{initial} + \sum_{i=N_j^{initial}+1}^{N_j} Y_j(i)Y_j(i)^T$$

where $N_j = N_j^{initial} + N_j^{actual}$, $N_j^{actual}$ is the actual number of samples that are classified as class $\omega_j$, $Y_j(i)$ for $i > N_j^{initial}$ is the received samples that are classified as class $\omega_j$, $SUMY_j^{initial} = N_j^{initial}\mu_j^{initial}$, and $SUMYY_j^{initial} = (N_j^{initial}-1)\Sigma_j^{initial} + N_j^{initial}\mu_j^{initial}(\mu_j^{initial})^T$.

Then, provided that there are $N_j$ training samples for class $\omega_j$, the mean vector and covariance matrix of class $\omega_j$ can be computed as follows:

$$\hat{\mu}_j(N_j) = \frac{1}{N_j}SUMY_j(N_j)$$

$$\hat{\Sigma}_j(N_j) = \frac{1}{N_j-1}SUMYY_j(N_j) - \frac{N_j}{N_j-1}\hat{\mu}_j(N_j)\hat{\mu}_j(N_j)^T.$$

It is noted that $N_j = N_j^{initial} + N_j^{actual}$ where $N_j^{actual}$ is the actual number of samples that are classified as class $\omega_j$. Thus, if $N_j^{initial}$ is small, the mean vector and covariance matrix of class $\omega_j$ will change rapidly as new samples are added to update the statistics. On the other hand, if $N_j^{initial}$ is large, the mean vector and covariance matrix of class $\omega_j$ will change more slowly.

As described previously, the following decision rule can be used:

Decide $\omega_j$ if $g_j(Y) > g_k(Y)$ for all $k \neq j$ (9)

where $g_j(Y) = -\ln(|\hat{\Sigma}_j|) - (Y - \hat{\mu}_j)\hat{\Sigma}_j^{-1}(Y - \hat{\mu}_j)^T$.

If the covariance matrices are identical, the following rule can be further simplified as follows:

Decide $\omega_j$ if $g_j(Y) < g_k(Y)$ for all $k \neq j$ (10)

where $g_j(Y) = 2Y\hat{\Sigma}^{-1}\hat{\mu}_j^T - \hat{\mu}_j\hat{\Sigma}^{-1}\hat{\mu}_j^T = 2\hat{\mu}_j\hat{\Sigma}^{-1}Y^T - \hat{\mu}_j\hat{\Sigma}^{-1}\hat{\mu}_j^T$.

In order to recursively update the parameters, the equalizer classifies an incoming sample with the current parameters and uses the result to update the statistics of the corresponding class. For example, if the incoming sample is classified as class $\omega_j$, $SUMY_j$ and $SUMYY_j$ are updated as follows:

$$SUMY_j(N_j+1) = SUMY_j^{initial} + \sum_{i=N_j^{initial}+1}^{N_j+1} Y_j(i)$$

$$SUMYY_j(N_j+1) = SUMYY_j^{initial} + \sum_{i=N_j^{initial}+1}^{N_j+1} Y_j(i)Y_j^T(i)$$

where $Y_j(N_j+1)$ is the current incoming sample. $\omega_j$, In practice, $SUMY_j$ and $SUMYY_j$ can be more efficiently updated as follows:

$$SUMY_j(N_j+1)=SUMY_j(N_j)+Y_j(N_j+1)$$

$$SUMYY_j(N_j+1)=SUMYY_j(N_j)+Y_j(N_j+1)Y_j(N_j+1)^T.$$

Then, the mean vector and covariance matrix are updated as follows:

$$\hat{\mu}_j(N_j+1) = \frac{1}{N_j+1} SUMY_j(N_j+1)$$

$$\hat{\sum}_j (N_j+1) = \frac{1}{N_j} SUMYY_j(N_j+1) - \frac{N_j+1}{N_j} \hat{\mu}_j(N_j+1)\hat{\mu}_j(N_j+1)^T.$$

Finally, the number of training samples of class $\omega_j$ is updated as follows:

$$N_j \Leftarrow N_j+1.$$

Sometimes, the confidence level of classifying incoming samples is low. Such samples might not be used to update the statistics of the corresponding class. In other words, one updates the parameters using only the samples that are classified with a high level of confidence.

What is claimed is:

1. A linear equalization method for a linear dispersive channel with known channel characteristics, characterized by $$y(n) = \sum_{k=-L_1}^{L_2} a_k x(n-k) + e(n),$$

comprising the steps of:
(a) constructing a vector from received signals as follows:

$$Y(n)=[y(n-L_1),y(n-L_1+1),\ldots,y(n),\ldots,(n),\ldots y(n+L_2-1),y(n+L_2)]^T;$$

(b) computing a weight vectors as follows:

$$w=\Sigma_Y^{-1}(\mu_{Y_1}-\mu_{Y_2})$$

where $$\mu_{X_1} = \left[\underbrace{0,\ldots,0}_{L_1 \text{ zeros}},1,\underbrace{0,\ldots,0}_{L_2 \text{ zeros}}\right]^T,$$

$$\mu_{X_2} = \left[\underbrace{0,\ldots,0}_{L_1 \text{ zeros}},-1,\underbrace{0,\ldots,0}_{L_2 \text{ zeros}}\right]^T,$$

$$\Sigma_{X_1}=I-\mu_{X_1}\mu_{X_1}^T,$$

$$\mu_{Y_1}=A\mu_{X_1},$$

$$\mu_{Y_2}=A\mu_{X_2},$$

$$\Sigma_Y=A\Sigma_{X_1}A^T+\sigma_e^2 I,$$

$$A = \begin{bmatrix} a_{-L_1} & a_{-L_1+1} & \ldots & a_{L_2-1} & a_{L_2} & \ldots & 0 & 0 & 0 \\ 0 & a_{-L_1} & a_{-L_1+1} & \ldots & a_{L_2-1} & a_{L_2} & \ldots & 0 & 0 \\ \ldots & \ldots & \ldots & \ldots & \ldots & \ldots & \ldots & \ldots & \ldots \\ 0 & 0 & \ldots & a_{-L_1} & a_{-L_1+1} & \ldots & a_{L_2-1} & a_{L_2} & 0 \\ 0 & 0 & 0 & \ldots & a_{-L_1} & a_{-L_1+1} & \ldots & a_{L_1-1} & a_{L_{21}} \end{bmatrix},$$

I is an identity matrix, and
$\sigma_e^2$ is the noise power; and
(c) determining a received signal according to the following rule:
if $w^T Y(n)>0$, then decide that state 1 is transmitted,
if $w^T Y(n)<0$, then decide that state $-1$ is transmitted.

2. A linear equalization method with unknown channel characteristics, comprising the steps of:
(a) constructing a class 1 vector from training signals when an input signal corresponding to y(n) is state 1, as follows:

$$Y_1(n)=[y(n-L_1),y(n-L_1+1),\ldots,y(n),\ldots,y(n+L_2-1),y(n+L_2)]^T;$$

(b) constructing a class 2 vector from training signals as follows when an input signal corresponding to y(n) is state $-1$:

$$Y_{-1}(n)=[y(n-L_1),y(n-L_1+1),\ldots,y(n),\ldots y(n+L_2-1),y(n+L_2)]^T;$$

(c) computing a weight vectors as follows:

$$w=\hat{\Sigma}_Y^{-1}(\hat{\mu}_{Y_1}-\hat{\mu}_{Y_2})$$

where $$\hat{\mu}_{Y_1} = \frac{1}{N_1}\sum_{i=1}^{N_1} Y_1(i)$$

($N_1$: the number of training vectors belonging to state 1), $$\hat{\sum}_{Y_1} = \frac{1}{N_1}\sum_{i=1}^{N_1}(Y_1(i)-\hat{\mu}_{Y_1})(Y_1(i)-\hat{\mu}_{Y_1})^T,$$

$$\hat{\mu}_{Y_2} = \frac{1}{N_2}\sum_{i=1}^{N_2} Y_2(i)$$

($N_2$: the number of training vectors belonging to state $-1$), $$\hat{\Sigma}_{Y_2} = \frac{1}{N_2}\sum_{i=1}^{N_2} (Y_2(i) - \hat{\mu}_{Y_2})(Y_2(i) - \hat{\mu}_{Y_2})^T,$$

and $\hat{\Sigma}_Y = (\hat{\Sigma}_{Y_1} + \hat{\Sigma}_{Y_2})/2$; and (d) determining a received signal according to the following rule:

if $w^T Y(n) > 0$, then decide that state 1 is transmitted, if $w^T Y(n) < 0$, then decide that state $-1$ is transmitted.

3. A blind linear equalization method, comprising the steps of:

(a) assigning initial parameters $\{N_j^{initial}, \mu_j^{initial}, \Sigma_j^{initial}\}$ where $N_j^{initial}$ is the initially assumed number of training samples of class $\omega_j$, $\mu_j^{initial}$ the initial estimator of the mean vector of class $\omega_j$, and $\Sigma_j^{initial}$ the initial estimator of the covariance matrix of class $\omega_j$;

(b) estimating the mean vector and covariance of class $\omega_j$ as follows:

$$\hat{\mu}_j(N_j) = \frac{1}{N_j} SUMY_j(N_j),$$

$$\hat{\Sigma}_j(N_j) = \frac{1}{N_j-1} SUMYY_j(N_j) - \frac{N_j}{N_j-1} \hat{\mu}_j(N_j)\hat{\mu}_j(N_j)^T,$$

where $N_j = N_j^{initial} + N_j^{initial'}$, $N_j^{initial'}$ is the actual number of samples that are classified as class $\omega_j$, $$SUMY_j(N_j) = SUMY_j^{initial} + \sum_{i=N_j^{initial}+1}^{N_j} Y_j(i), \text{ and}$$

$$SUMYY_j(N_j) = SUMYY_j^{initial} + \sum_{i=N_j^{initial}+1}^{N_j} Y_j(i)Y_j(i)^T;$$

(c) determining a received signal according to the following rule:

if $g_j(Y(n)) > g_k(Y(n))$ for all $k \neq j$, then decide $\omega_j$ where $g_j(Y(n)) = -\ln(|\hat{\Sigma}_j|) - (Y(n) - \hat{\mu}_j)\hat{\Sigma}_{Y_j}^{-1}(Y(n) - \hat{\mu}_j)^T$;

(d) updating the parameters as follows:

$SUMY_j(N_j+1) = SUMY_j(N_j) + Y_j(N_j+1)$, $SUMYY_j(N_j+1) = SUMYY_j(N_j) + Y_j(N_j+1)Y_j(N_j+1)^T$, $N_j \Leftarrow N_j + 1$ where $Y_j(N_j+1)$ is $Y(n)$ that is the current incoming vector, which is classified as class $\omega_j$.

4. A linear equalization method that views equalization as a multiclass classification problem by considering a plurality of bits simultaneously, comprising the steps of:

(a) constructing a received vector from received training signals as follows:

$Y(n) = [y(n-L_1), y(n-L_1+1), \ldots, y(n), \ldots, y(n+L_2-1), y(n+L_2)]^T$;

(b) assigning said received vector to one of the classes, each of which has a unique bit pattern of said plurality of bits and thereby generating a set of training vectors for each class;

(c) estimating a mean vector from said set of vectors for each class as follows:

$$\hat{\mu}_{Y_j} = \frac{1}{N_j}\sum_{i=1}^{N_j} Y_j(i)$$

where $\hat{\mu}_{Y_j}$ is an estimated mean vector of class $\omega_j$, $Y_j(i)$ is the i-th training vector of class $\omega_j$, and $N_j$ is the number of vectors corresponding to class $\omega_j$;

(d) estimating a covariance matrix from said set of vectors for each class as follows:

$$\hat{\Sigma}_{Y_j} = \frac{1}{N_j}\sum_{i=1}^{N_j} (Y_j(i) - \hat{\mu}_{Y_j})(Y_j(i) - \hat{\mu}_{Y_j})^T$$

where $\hat{\Sigma}_{Y_j}$ is an estimated covariance matrix of class $\omega_j$; and (e) determining a received signal according to the following rule:

if $g_j(Y(n)) > g_k(Y(n))$ for all $k \neq j$, then decide $\omega_j$ where $g_j(Y(n)) = -\ln(|\hat{\Sigma}_j|) - (Y(n) - \hat{\mu}_j)\hat{\Sigma}_{Y_j}^{-1}(Y(n) - \hat{\mu}_j)^T$, $\hat{\mu}_j$ is said estimated mean vector of class $\omega_j$, and $\hat{\Sigma}_j$ is said estimated covariance matrix of class $\omega_j$.

* * * * *